United States Patent
DeAnna et al.

(10) Patent No.: US 10,698,663 B1
(45) Date of Patent: *Jun. 30, 2020

(54) SYSTEM AND METHOD FOR PERVASIVE SOFTWARE PLATFORM-BASED MODEL DRIVEN ARCHITECTURE APPLICATION GENERATOR

(71) Applicant: Open Invention Network LLC, Durham, NC (US)

(72) Inventors: Robert DeAnna, Frisco, TX (US); Robert W. Peterson, Plano, TX (US); Thomas T. Wheeler, Frisco, TX (US); Qin Ye, Plano, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,491

(22) Filed: Dec. 31, 2018

Related U.S. Application Data

(63) Continuation of application No. 15/784,156, filed on Oct. 15, 2017, now Pat. No. 10,175,957, which is a continuation of application No. 15/013,376, filed on Feb. 2, 2016, now Pat. No. 9,792,096, which is a continuation of application No. 13/151,594, filed on Jun. 2, 2011, now Pat. No. 9,250,883.

(51) Int. Cl.
  *G06F 8/35* (2018.01)
  *G06F 8/60* (2018.01)
  *G06F 8/30* (2018.01)

(52) U.S. Cl.
  CPC ............ *G06F 8/35* (2013.01); *G06F 8/30* (2013.01); *G06F 8/31* (2013.01); *G06F 8/60* (2013.01)

(58) Field of Classification Search
  CPC ..... G06F 8/30; G06F 8/31; G06F 8/35; G06F 8/41; G06F 8/60; G06F 9/546; H04L 5/0035
  USPC .............. 717/106–109, 140–161, 174–178; 709/204–207; 719/313–317
  See application file for complete search history.

(56) References Cited

U.S. PATENT DOCUMENTS

| | | |
|---|---|---|
| 5,347,654 A | 9/1994 | Sabot et al. |
| 6,199,195 B1 | 3/2001 | Goodwin et al. |
| 6,272,675 B1 | 8/2001 | Schrab et al. |
| 6,321,374 B1 | 11/2001 | Choy |
| 7,069,540 B1 | 6/2006 | Sievert |
| 7,287,037 B2 | 10/2007 | An et al. |
| 7,346,702 B2 | 3/2008 | Haviv |
| 7,404,177 B1 | 7/2008 | Greenfield et al. |
| 7,805,732 B2 | 9/2010 | Manzano et al. |
| 7,840,939 B1 | 11/2010 | Chinnici |
| 8,010,962 B2 | 8/2011 | Tal et al. |
| 2002/0059451 A1 | 5/2002 | Haviv |
| 2003/0018950 A1 | 1/2003 | Sparks et al. |

(Continued)

OTHER PUBLICATIONS

Bourdenas et al., "Self-healing for Pervasive Computing Systems," 2010, Springer-Verlag, pp. 1-25. (Year: 2010).

*Primary Examiner* — Qing Chen

(57) ABSTRACT

In developing applications for a plurality of node types, a meta-data definition of the application can be captured into an application definition module. The meta-data definition can describe the application for the plurality of node types. A code generation module can then automatically generate the application code for the plurality of node types. The code can be compiled per node type and the packaging necessary to deploy the application to the plurality of node types can also be automatically generated.

20 Claims, 10 Drawing Sheets

(56) References Cited

U.S. PATENT DOCUMENTS

| | | |
|---|---|---|
| 2004/0230556 A1 | 11/2004 | Mueller et al. |
| 2004/0250238 A1 | 12/2004 | Singh et al. |
| 2005/0050141 A1 | 3/2005 | An et al. |
| 2005/0144590 A1 | 6/2005 | Limprecht et al. |
| 2006/0236316 A1 | 10/2006 | McDowell |
| 2007/0067766 A1 | 3/2007 | Tal et al. |
| 2007/0261060 A1 | 11/2007 | Manzano et al. |
| 2007/0266384 A1 | 11/2007 | Labrou et al. |
| 2008/0114806 A1 | 5/2008 | Kosche |
| 2010/0011340 A1 | 1/2010 | Pandey |
| 2010/0287208 A1 | 11/2010 | Mao et al. |
| 2011/0035742 A1 | 2/2011 | Shenfield |
| 2011/0047540 A1 | 2/2011 | Williams et al. |
| 2011/0078672 A1 | 3/2011 | Stark et al. |
| 2011/0231824 A1 | 9/2011 | Chabbi et al. |
| 2012/0144448 A1 | 6/2012 | Gunawardena et al. |
| 2012/0254867 A1 | 10/2012 | Lind et al. |
| 2012/0331484 A1 | 12/2012 | Vickers et al. |

SYSTEM AND METHOD FOR PERVASIVE SOFTWARE PLATFORM-BASED MODEL DRIVEN ARCHITECTURE APPLICATION GENERATOR

FIELD OF THE INVENTION

This disclosure relates to applications that run on multiple node and device types, and in particular to systems and methods for generating pervasive applications.

BACKGROUND OF THE INVENTION

There is currently no model/meta-data driven approach to generating code for applications that span heterogeneous networks, devices and their underlying operating systems, software languages, software protocols and messaging capabilities. This is not only true for simple client-server mobile environments, but also environments that involve peer-2-peer and peer-2-group communication.

There is a need to provide a complete solution (Platform and tools to generate applications on such) for advanced applications including those that fall into the category of Distributed Knowledge Networks and Intelligent Sensor Network based applications. These types of advanced applications will run on the Internet of Things that include smartphones, MIDs, UMPCs, Netbooks, eBooks, Auto-based Computers, Home Storage Devices, Desktops/Laptops, Routers, Switches, Sensors and on and on.

There are no solutions that solve the problem above. There are code generation capabilities for applications with homogenous platforms and/or client-server web services/HTTP based architecture. There are also such capabilities for specific device subsets (smartphones or desktops for example). But there is no MDA solution to enable pervasive applications that are defined by the characteristics above.

What is required is a system and method for improved generation of pervasive applications.

SUMMARY OF THE INVENTION

In one aspect of the disclosure, there is provided a method for creating pervasive applications executable by a plurality of node types. The method comprises capturing a meta-data definition of the application into an application definition module, the meta-data definition describing at least the plurality of node types. Code per node type may be automatically generated and compiled for the plurality of node types in a code generation module. The packaging necessary to deploy the application to the plurality of node types may also be generated.

In one aspect of the disclosure, there is provided a system for generating applications comprising an application object model definition module and a code generator module. The application object model definition module provides an interface to receive inputs from a user that define an object model for an application. The code generator module generates the application code for an object model of an application defined through the application object model definition module.

In one aspect of the disclosure, there is provided a computer-readable medium comprising computer-executable instructions for execution by at least one processor, that, when executed, cause the at least one processor to provide an interface that allows a user to enter a meta-data definition of an application, the meta-data definition comprising a plurality of node types; generate application code per node type for the plurality of node types; and compile the code per node type.

BRIEF DESCRIPTION OF THE DRAWINGS

Reference will now be made, by way of example only, to specific embodiments and to the accompanying drawings in which.

DETAILED DESCRIPTION OF THE INVENTION

The systems and methods to be described in the embodiments below provide a means for the development of pervasive applications that can deployed to multiple node types. The applications may be developed in conjunction with a pervasive computing platform of the type described in the present Applicant's patent application Ser. No. 13/151,671, referenced above.

The pervasive software platform provides a single set of APIs for discovering, accessing and hosting services and data, across operating systems, languages and protocols. The code generation approaches are not intelligent enough, thereby enabling simplification of the code generation process.

The pervasive platform could be part of the application or application library, a dependent library for the application or application library and/or part of the device. The pervasive platform may also be dependent on the target type, similar to the application/application library.

Figure 1:
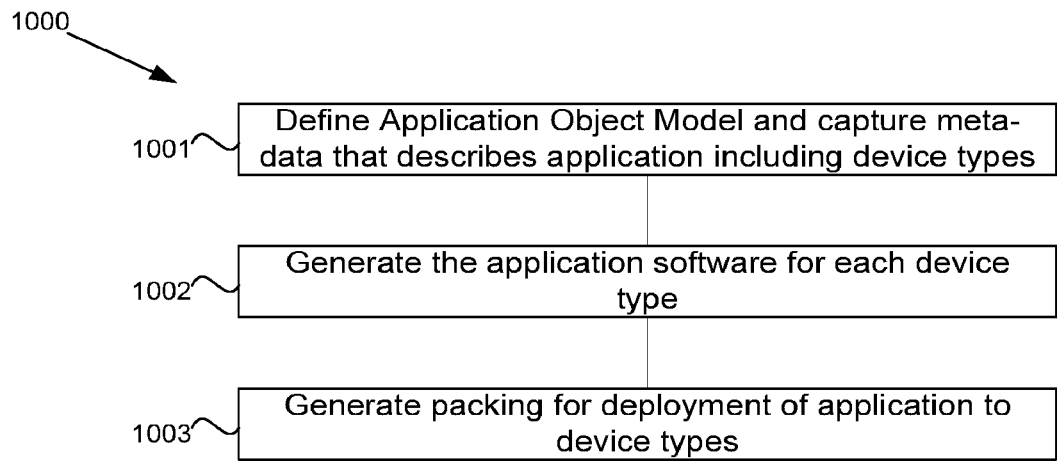
FIG. 1 shows method for generation of pervasive applications.

An embodiment of the process for development of pervasive applications is depicted in the flowchart 1000 of FIG. 1. At step 1001, an application developer defines an object model and associated meta-data for an application through a development interface. The specification of the meta-data includes the target types. At step 1002, the development interface processes the meta-data as per the application object model to generate the code for the application. At step 1003, the development interface generates the packaging for deployment of the application to the indicated device types.

Figure 2:
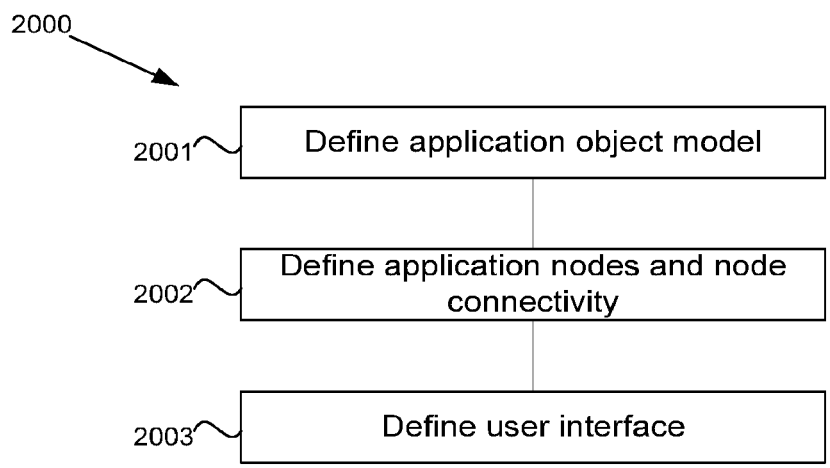
FIG. 2 shows a method for capturing meta-data of an application.

A process for capturing the application definition is shown in more detail in the flowchart 2000 of FIG. 2. At step 2001, the development interface receives inputs from the application developer that specify an application object model for the application. At step 2002, the development interface receives inputs that define the application nodes and node connectivity. At step 2003, the development interface receives a definition of the user interface.

In capturing the meta-data, a first step is to describe the Application Object Model through a tool and store it in an Object Model Repository. Above and beyond the typical data captured in an object model (classes, interfaces and their attributes, methods, exceptions etc.), certain additional information is captured such as whether the class is mobile or persistent or location-aware. For interfaces, the meta data may include whether they are remotely accessible. All classes and interfaces are associated with one or more applications.

Once the application object model has been defined, various meta-data may then be captured. This usually is only done once. For example Language Types (Java, .NET Languages, Unmanaged C++, Javascript, PHP, etc.). Virtual Machine Language Type (JME, JSE, Dalvik, .NET, CF, Silverlight etc.), Operating System Types (Linux, Win Mobile/CE/XP, Unix, Blackberry, MAC/iPhone, Symbian, etc.), Platform Types (JSE, .NET/CF, Android, Limo, Symbian, Meego, iPhone, etc.), Network Types (Wire, WiFi, GSM/CDMA, WiMax/LTE, Bluetooth, Zigbee, NFC), Database Types (Relational, Object, Object-relational, XML), Database Type Instances (SqlLite, DB2, DB2e, Oracle, Oracle Light, DB40), Protocol Types (SOAP, HTTP, XML-RPC, IIOP, RMI/IIOP, OBEX, REST, etc.) Message Types (JMS, MSMQ, RPC, Socket, DDS, etc.), Serialization Type (Binary, XML, JSON, Character etc.).

A process is used to capture information about the pervasive application. The process may comprise defining the node types, associating the business processes with the particular device types, and defining the messaging that occurs between node types associated with the application. For example the various Node Types participating in the application are first specified. This may be performed, for example, from drop down menus on the development interface or by dragging and dropping device types into the application. The main attributes that describe a Node Type are its device type, platform type, operating system, supported networks, preferred software development languages and virtual machines. Then the business processes that are desired are associated with the particular device type. The business process involves message flows between objects etc. This may be captured through conventional OOA/OOD tools such as use cases, sequence diagrams and interaction diagrams.

When a business object is configured onto a node, the development interface prompts the user (developer) to specify a) whether the business object is remotely accessible, b) whether the business object is mobile (can migrate between devices), and c) whether the business object is persistable. The business intelligence objects may also be rules aware.

In the pervasive computing world with applications spanning heterogeneous device sets, there is the additional need for capturing additional type of messaging that occurs between node types associated with the application. This is done as follows. In the case of peer-2-peer messaging between two node types, there are two important pieces of information. The first is the network type that connects the two devices (IP-based or some other non-IP based network). The second is the preference for distributed protocols to be used when invoking services on the two devices. For example a first preference of Binary XML followed by IIOP, XML-RPC and SOAP, if performance is a concern. The process is similar in the case of peer-2-group messaging between groups of node types. After the collection of node types is selected, again, as above, the network type that connects these devices is selected. Then the messaging protocol is established. This list would include such protocols as TCP/IP, UDP, JMS, MSMQ or DDS for example.

Figure 3:
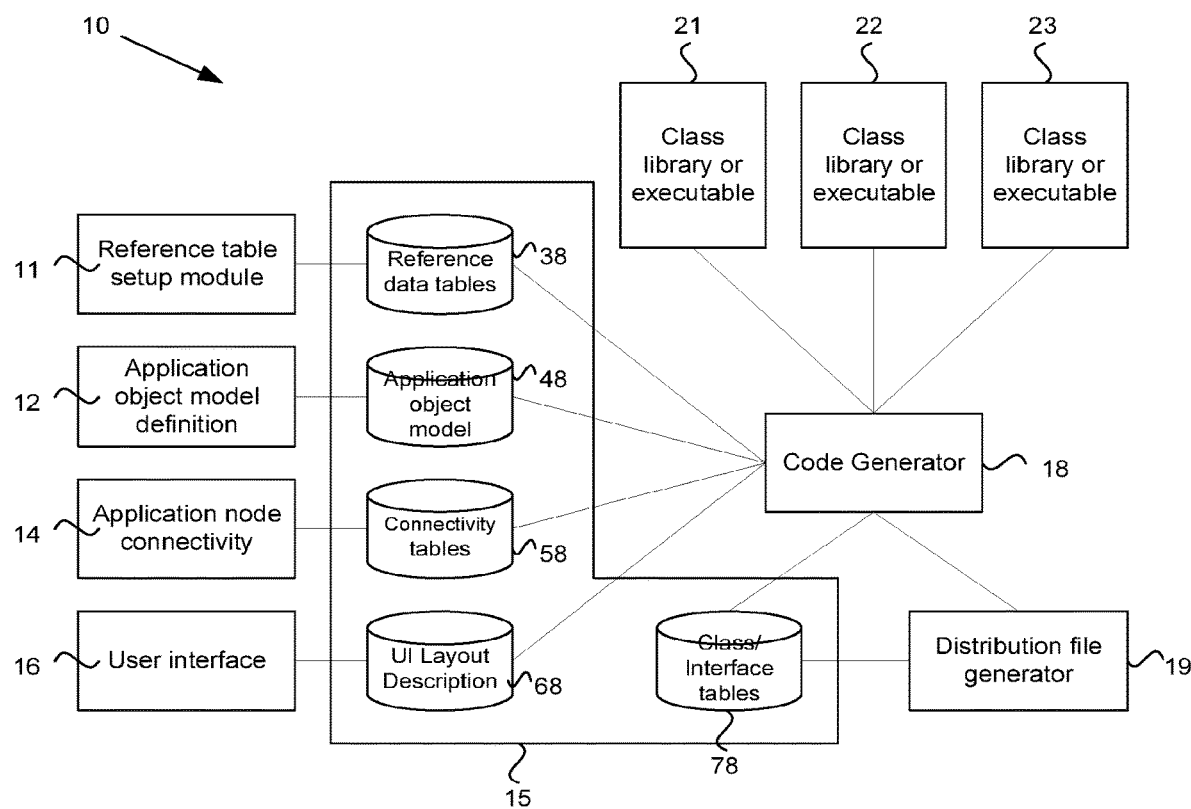
FIG. 3 shows a system for generation of pervasive applications.

The above described processes may be performed using an application development system 10 as illustrated in FIG. 3. The development system 10 may include a plurality of software modules including a reference table setup module 11, an application object model module 12, an application node connectivity module 14, a user interface module 16, a source code generation module 18 and a distribution file generation module 19. The development interface 10 also includes one or more databases 15 for storing pervasive meta-data and application data in various tables 38, 48, 58, 68, 78, as will be described in more detail below.

Figure 4:
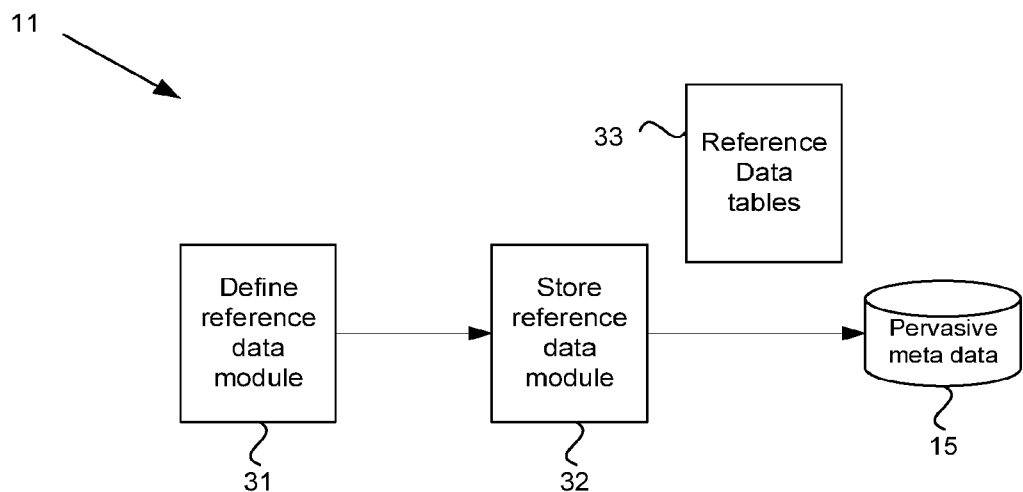
FIG. 4 shows a reference data module.

The reference table setup module 11 is shown in more detail in FIG. 4. The reference table module 11 operates to provide a user interface by which a user, such as an application developer, may define pervasive environment reference data 31. This data describes the device types, the device type platforms, networks etc that can be utilized by any application within the organization utilizing the MDA Tool.

Through this module, the enterprise architect, system administrator or application developer can populate tables based on suggestions provided and knowledge of targeted devices, networks, platforms etc. The reference table setup module 11 generates one or more reference data tables 38 that are added 32 to the pervasive meta-data database 15. The reference data tables 38 may be stored in XMI/MOF Format. The reference data may include the following:

Language Type (Java, .NET Languages, Unmanaged C++, Javascript, PHP . . . );
Virtual Machine Language Type (JME, JSE, Dalvik, .NET, CF, Silverlight . . . );
OS Type (Linux, Win Mobile/CE/XP, Unix, Blackberry, MAC/iPhone, Symbian . . . );
Platform Type (JSE, .NET/CF, Android, Limo, Symbian, Meego, iPhone . . . );
Network Type (Wire, WiFi, GSM/CDMA, WiMax/LTE, Bluetooth, Zigbee, NFC);
Database Type (Relational, Object, Object-relational, XML);
Database Type Instance (SqlLite, DB2, DB2e, Oracle, Oracle Light, DB40);
Node Type (phone, MID/UMPC, laptop, eBook, setTop, camera, router, smart . . . );
Node Type Network;
Protocol Type (SOAP, HTTP, XML-RPC, HOP, RMI/IIOP, OBEX, REST . . . );
Protocol Network Type;
Message Type (JMS, MSMQ, RPC, Socket, DDS etc.);
Serialization Type (Binary, XML, JSON, Character etc.);
Message Serialization Type.

Figure 5:
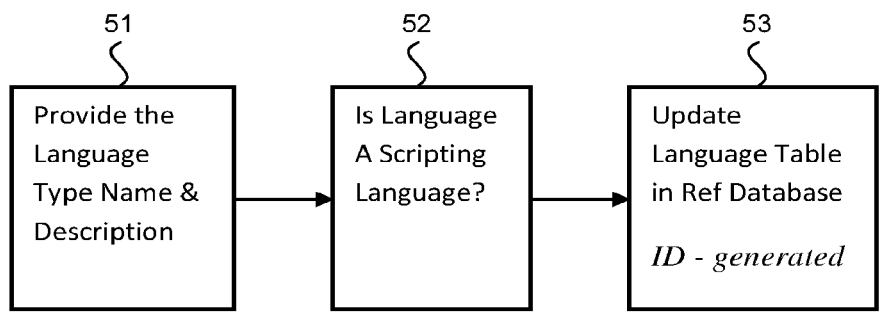
FIG. 5 shows a process for defining a language type.

By way of example, a process for defining the language type is depicted in FIG. 5. The designer provides the language type name and description at step 51 and defines if the language is a scripting language at step 52. A language table in the reference database is then updated with the new language type data at step 53, including generating and storing an ID for the language type. Similar processes may be followed for defining the other types of reference table data mentioned above.

Figure 6:
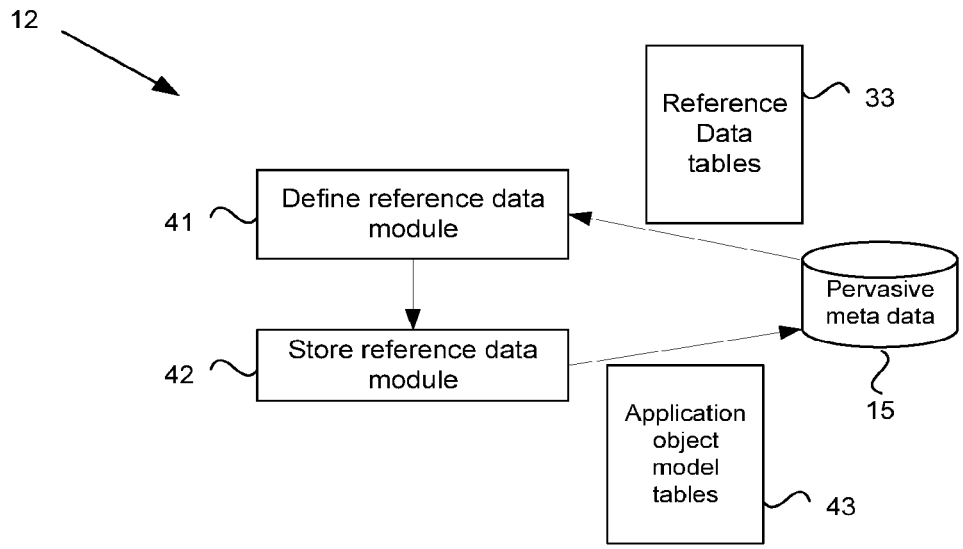
FIG. 6 shows an application object model definition module.

The system 10 includes an Application Object Model Definition module 12 which performs as shown in more detail in FIG. 6. The Application Object Model Definition module 12 provides an interface enabling an application developer to define an object model 41 for the application under development by way of one or more application object model tables 48. The Application Object Model Definition module 12 may prompt the developer to define:

Name and Description of Application for which the Object Model applies;
use cases, interaction and sequence diagrams;
components;
packages;
classes, interfaces, underlying methods etc.;
if interfaces are remotely accessible? If so, mark with a Remotable interface;
if classes are mobile? If so, mark with a Serializable interface;
if classes persistent? If so, mark with a Persistent interface;
if classes are location-aware? If so, mark with a Location-Aware interface;

In prompting the developer for these definitions, the Application Object Model Definition module 12 may make reference to the reference data tables 38 stored in the database. Once the object model has been defined for the application, the Application Object Model Definition module 12 stores the provided definitions as meta-data in one or more application object model tables 48 in the database 15. The object model may be stored in XMI/MOF Format including data for:

Application
Application UI Type (NA, SWT/eSWT, .NET, Java/ActionScript, PHP . . . )
Application Instance UI Type (NA, SWT/eSWT, .NET, Java/ActionScript . . . )
Application Component
Application Component Package
Class
Interface
Interface Parent
Class Attribute
Class Method
Interface Method
Method Argument
Exception
Method Exception
Class Method Source To define an application, a designer may initially define an application include a name and description. The application may be given an application ID which is added to an application table in the Application Object Model database. The designer may then provide an application UI type name and description, which is also assigned an ID and added to an Application UI Type table in the Application Object Model database in association with the application ID for the application. Any Application Instance UI types can be similarly defined.

Figure 7:
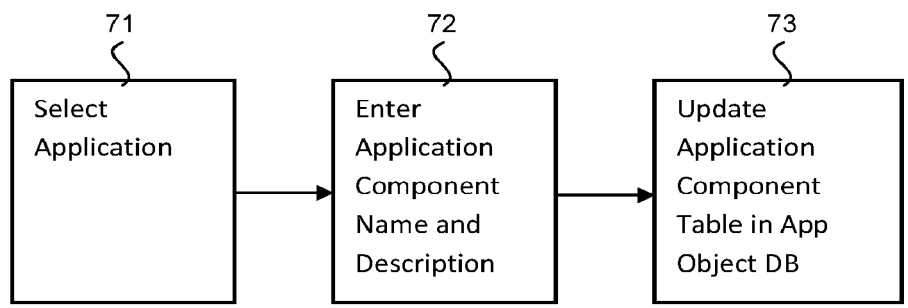
FIG. 7 shows a process for defining an application component.

A process for defining an application component is depicted in FIG. 7. The designer selects through the development interface the application that is being developed (step 71). The designer then enters the application component name and a description of the application component (step 72). At step 73, the defined application component is added to the application component table in the application object model database. Application Component Packages can be defined for an application component by selecting the application and the application component and then entering the application component package name and description. The Application Component Package data is then added to an Application Component Package Table in the Application Object Model database.

Figure 8:
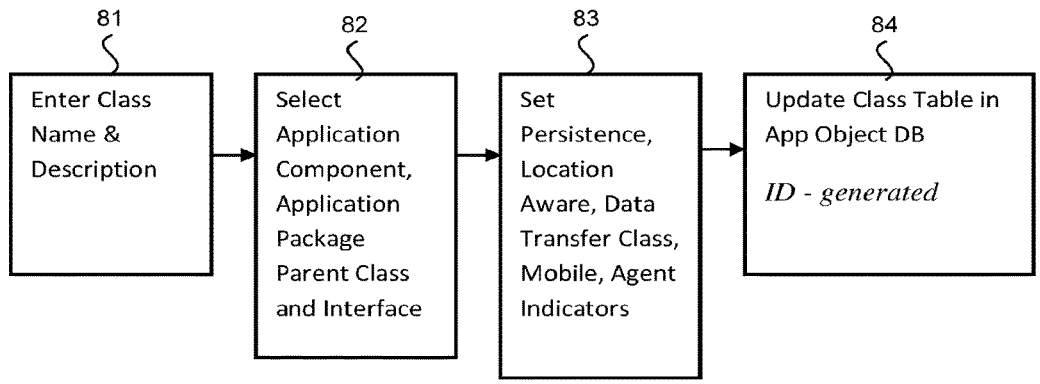
FIG. 8 shows a process for defining parameters of an application component.

The designer may then define any classes for the application component package following a process depicted in FIG. 8. At step 81, the designer enters the class name and description. The designer then selects the application component, application component package, parent class and interface for this class (step 82). The designer may then provide indicators that specify whether the class is persistent, location aware and mobile as well as data transfer class and agent indicators (step 83). The data is then stored in a class table in the application object database (step 84). Data for each of the application parameters and components mentioned above may be added in a similar manner to the process depicted in FIG. 8. Data fields for each of the respective application object model data tables is provided in an example database schema described below.

The system 10 may include a User Interface Definition module 16 which may provide an interface to receive inputs from the application developer. Through this interface, the developer may:

a) Select an Application Node;
b) Describe Classes that are accessible via UI;
c) Describe whether classes allow for Create, Read, Update, Delete, Search (CRUDS);
d) Wire UI Javascript functions/methods/events to corresponding native Business Object Class methods that allow for bidirectional communication between native application logic and Javascript/HTML presentation layer.

Figure 9:
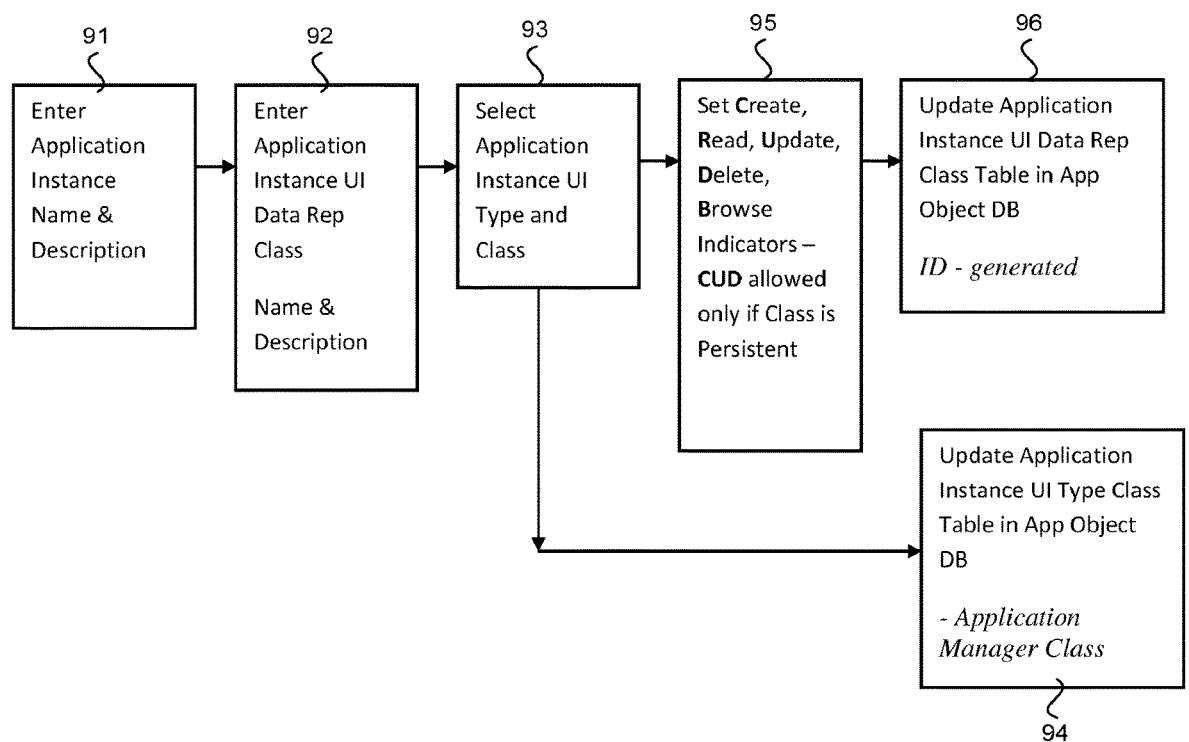
FIG. 9 shows a process for defining an application instance UI data representation class.

The meta-data provided via the User Interface Definition module 16 may be stored in one or more Application Instance User Interface tables 68. The meta-data stored may include:

Application Instance UI Data Representation Class;
Application Instance UI WebView Page Source;
Application Instance UI WebView JavaScript Function;
Application Instance UI WebView Source Callback;

An example schema for the UI tables is provide in the sample database schema below. A process for defining the application instance UI data representation class is depicted in FIG. 9. At step 91, the developer enters the application instance name and description. The developer then enters the respective application instance UI data representation class and name and description (step 92). The developer then selects an application instance UI type and class (step 93). After selection, the application instance UI type class table is updated (step 94). The developer then sets the CRUDs and Browse indicators (step 95) (CUD indicators only being set if the class is persistent). These indicators are then updated in the relevant table in the Application Object Database (step 96).

Figure 10:
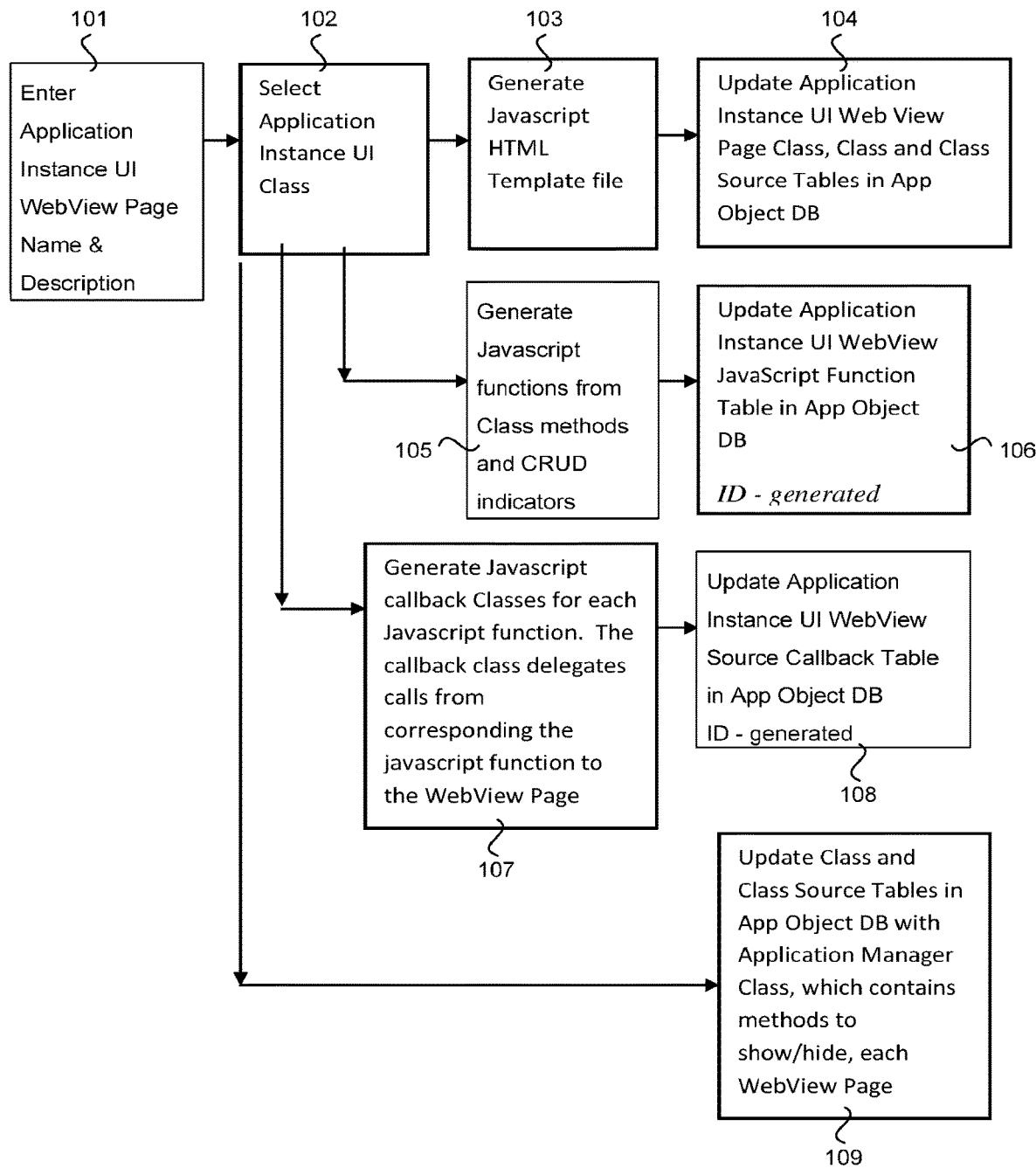
FIG. 10 shows a process for defining an application instance UI Webview Source callback.

A process for defining the application instance UI Webview Source callback is depicted in FIG. 10. At step 101, the developer enters the application instance UI webview page name and description. The developer then sets the application instance UI class (step 102). A javascript HTML template file is then generated (step 103) which is used to update the class and class source tables for the application instance UI web view page class (step 104). At step 105, the javascript functions are generated from the class methods and CRUD indicators and used to update the Application Instance UI WebView JavaScript Function Table in the application object database (step 106). At step 107 the Javascript callback Classes for each Javascript function are generated. The callback class delegates calls from the corresponding javascript function to the WebView Page. This data is added to the respective Application Instance UI Source Callback table (step 108). At step 109, the Class and Class Source Tables in application object database are updated with Application Manager Class, which contains methods to show/hide each WebView Page.

The application development system 10 may include an Application Node Connectivity module 14 that provides an interface configured to receive input from the application developer that defines Application Node Types as well as connectivity between the node types. The developer may indicate node types in various ways, such as by selecting from drop down menus that reference defined node types in the reference data tables 38, by drag & drop into an application window, etc. A target type may have subtypes. For example, a mobile device type may have subtypes such as MiD, UMPC, Smartphone, PND, etc.

The Application Node Connectivity module 14 may also enable the application developer to define Peer-2-Peer Connectivity between node types. For example, the user may select two Application Nodes, select or indicate Network Type(s) between the Application Nodes and then select or indicate Distributed Protocol Type(s) between both Application Nodes. The network types and distributed protocol types may be indicated by selecting the available types from data provided in the reference data tables 38.

The Application Node Connectivity module 14 may also enable the application developer to define Peer-2-Group Connectivity. Through this interface, the developer may:
a) Select Application Nodes participating in Group;
b) Provide Group Name;
c) Specify Node that host Group;
d) Select Network Type(s) between both Application Nodes;
e) Select Distributed Protocol Type(s) between both Application Nodes; and
f) Select Messaging Type(s) between both Application Nodes.

The meta-data provided via the Application Node Connectivity module 14 may be stored in the pervasive meta-data database 15 in one or more application node connectivity tables 58. The connectivity tables may include fields for
Node Type Application;
Peer-2-Peer Link;
Peer-2-Peer Link Dist Protocol;
Group;
Group Node Type;
Peer-2-Group Protocol.

To enable the application developer to describe the node connectivity, the system 10 may provide information from the reference data tables 38 as well as definitions from the Application Object Model tables 48. An example schema for the connectivity tables discussed above is provided below.

Figure 11:
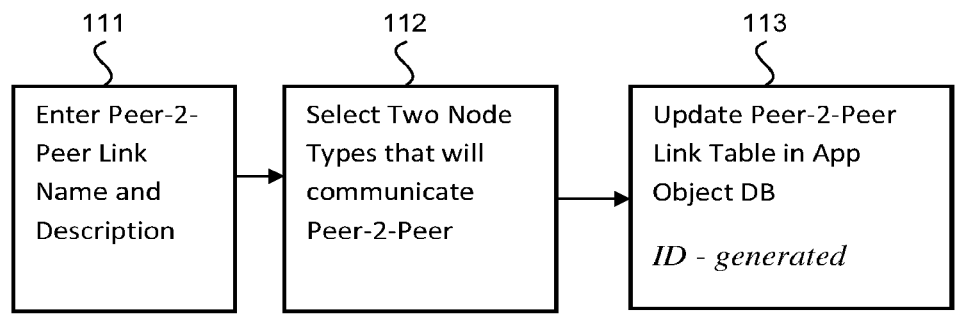
FIG. 11 shows a process for defining a peer-to-peer link.

A process for defining a peer-to-peer link is depicted in FIG. 11. At step 111, the developer enters a peer-to-peer link name and description. The developer then selects two node types that will communicate peer-to-peer (step 112). This information is then added to a peer-to-peer link table in the application object database (step 113).

Figure 12:
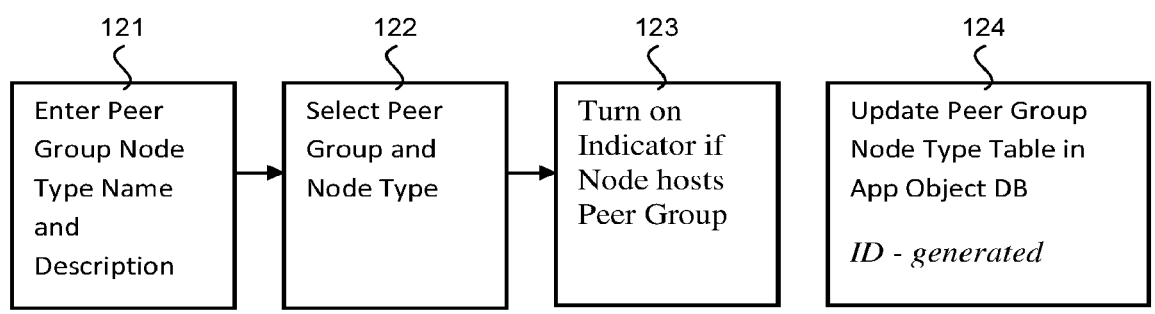
FIG. 12 shows a process for defining a peer group node type.

A process for defining a peer group node type is depicted in FIG. 12. At step 121, the developer enters a peer group node type name and description. The developer then selects a peer group node type (step 122). If the selected node type hosts a peer group, an indicator is turned on (step 123). The data is then updated to a peer group node type pay table in the application object database (step 124).

The system 10 may include a Generate Source Code module 18. The generate source code module 18 is the module that produces the application code based upon the definitions provided by the application developer in the respective tables 48, 58, 68 and with reference to the reference data tables 38. Once the definitions for the application have been provided, the Generate Source Code module 18 reads all of the tables (i.e. tables 38, 48, 58, 68) as well as tables joined from other repositories. In the code generation phase, the code generator module 18 generates the source code and either byte code or machine code for the specified target types. The Code Generator accesses class libraries or executables 21, 22, 23 which are provided per target type. The code generator 18 may generate the whole application or parts of the application.

Figure 13:
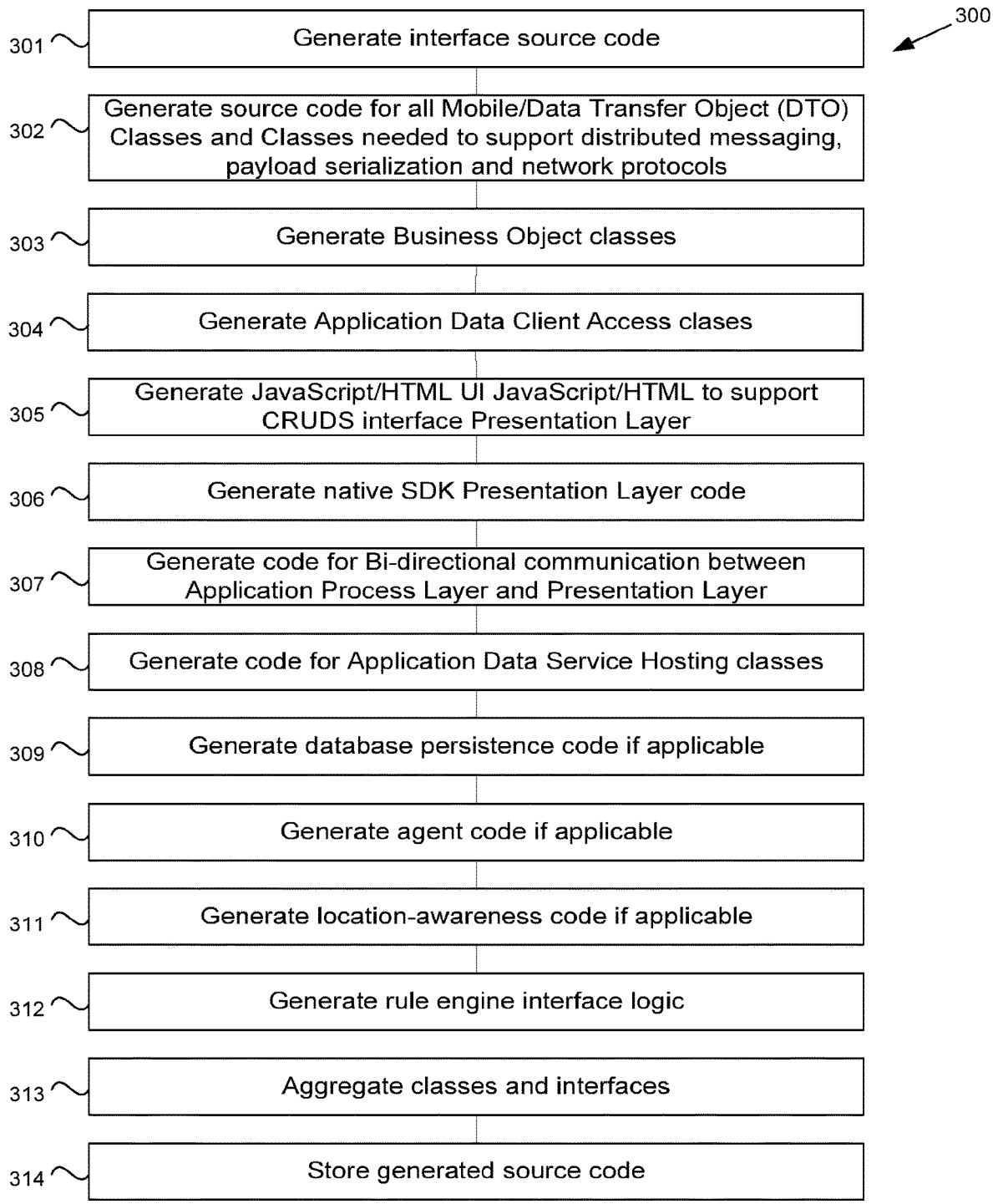
FIG. 13 shows a method for generating code for a pervasive application.

For each node type of the application node connectivity table 58, the generate source code module 16 generates code for the node type using the application class library or executable library 21, 22, 23 for that node type. The process for generating the source code is depicted in the flowchart 300 of FIG. 13. At step 301, the code generator module 18 generates all Interface source code. This is generated from the Application Object tables 23, 31, 32, 38, 34, and put in table 35b.

At step 302, the code generator module 18 generates source code for all Mobile/Data Transfer Object (DTO) Classes and Classes needed to support various distributed messaging, payload serialization and network protocols. The source code is generated using the data from the Application Object Model tables 22, 23, 25, 30, 32, 38 and 34.

These classes represent the data (complex objects) that is passed/returned as part of method invocations and responses. This process utilizes the Universal Serialization Sub-Module/API of the Pervasive Computing Platform described in the present Applicant's U.S. application Ser. No. 13/151,671, referenced above. The Universal Serialization API is accomplished by interfaces and accompanying methods that are implemented for a DTO to be universally Serializable. The DTO classes are generated with these interfaces/methods implemented. These methods utilize the Universal Serialization Sub-Module/API of the Pervasive Computing Platform. At step 303, the code generator module 16 reads the Application Object Model tables 22, 23, 25, 30, 32, 38 and 34 and generates Business Object Classes with stubbed out business process methods.

At step 304, the code generator module processes the data tables to generate Application Data "Client" Access classes that allow for access to any node (P2P) or group of nodes (P2Group) using any protocol specified in the application node connectivity tables.

For P2P, the code generator module 18 utilizes the Universal Service Discovery/Access/Host Sub-Module/APIs of Pervasive Computing Platform. These modules provide the capability for services running on a device, to be discovered via any other devices by name (White Pages) or description (Yellow Pages).

For P2Group, the code generator module 18 utilizes the Universal Pub/Sub Group Messaging Sub-Module/API of Pervasive Computing Platform. These modules provide the capability for devices to invoke method services on each other in a Peer-2-Peer manner, or can publish/subscribe Universal Business Objects (i.e. Universally Serializable DTOs) to virtual groups of heterogeneous devices.

The Universal Pub-Sub API may include the following interface.

1) An Interface which allows you to Publish/Subscribe to data by Topic:
   a) void close( )
   b) Object getAddress( )
   c) Object getListener( )
   d) Object getSession( )
   e) Object receive( )
   f) Object receive(String selector)
   g) List receiveAll( )
   h) void releaseResources( )
   i) void removeAll( )
   j) Object request(Object payload)
   k) void send(Object payload)
   l) void sendAll(List payloads)
   m) void setListener(MessageListener listener)

2) A Callback Interface which allows you to receive messages:
   a) boolean onMessage(Object message).

There is Pub-Sub Messaging Factory, which loads an instance of the appropriate class that implements the above Pub-Sub interface; based on the platform the application is running on and configuration settings describing the type of publish and subscribe messaging capability desirable on such a platform.

The implementation class is exposed as a remotely accessible object via the first interface described above. The object is bound to the Universal Directory, with a well-known name. From that point on the local application communicates with the Universal Pub-Sub Messaging interface described above. Remote nodes can communicate with the remotely accessible interface, by discovering it via the Universal Directory, based on its well-known name.

At step 305, the code generation module 18 generates JavaScript/HTML UI JavaScript/HTML to support CRUDS interface Presentation Layer.

At step 306, the code generate module 18 generates Native SDK Presentation Layer code to provide/interact with JavaScript/HTML code to/with underlying Web Engine is also generated leveraging the Universal User Interface Sub-Module/API of the Pervasive Computing Platform. This module provides a UI API that allows for communicating bi-directionally with the platforms underlying webengine (WebKit, IE/Silverlight etc) via JavaScript and support HTML 5. It allows for Bi-directional communication between Application Process Layer and Presentation Layer utilizing Universal API's of Pervasive Computing Platform.

The Universal UI Interface may include two interfaces.

1) A remotely accessible Interface, which represents the type of actions that can be done to render or access a User Interface's state
   a. loadHtmlData (String htmlAndJavascript)—updates the WebView with HTML provided
   b. loadUrl (String aUrl)—updates the WebView with the contents from the URL provided
   c. updateHtml(String aHtmlObjectName, String aHtmlObjectValue)—
   d. addJavascriptInterface(Object aCallbackObject, String aCallbackName)

2) A locally accessible Interface, which represents additional actions that are needed to interact with the underlying user interface engine
   a. setContext(Object)—set the application context for the Universal UI
   b. addPageToApplicationFrame(Object, Object)—adds the WebView Page to the Application Frame
   c. getNativeBrowserUIObject( )—returns the native Browser WebView UI Object There is Universal UI Factory, which loads an instance of the appropriate class that implements the above interfaces; based on the platform the application is running on. The implementation class is exposed as a remotely accessible object via the first interface described above. The object is bound to the Universal White Pages, with a well-known name. From that point on the local application simply communicates with the Universal UI interface described above. Remote nodes can communicate with the remotely accessible interface, by discovering it via the Universal White Pages, based on its well-known name.

At step 307, the code generation module 18 generates code for Bi-directional communication between Application Process Layer and Presentation Layer utilizing Universal API's of Pervasive Computing Platform. At step 308, the code generation module 18 generates Application Data Service Hosting classes for any services hosted on a device. This process leverages the Universal White Pages, Yellow Pages and Peer-2-Peers Sub-Modules/API of Pervasive Computing Platform. This step includes generating any Proxy classes that are responsible for serialization/de-serialization of payload (object reference, method arguments, exceptions and return values). These Proxy classes communicate with underlying Universal Core Request Brokering Sub-Module/API of the Pervasive Computing Platform.

For those classes marked as persistent, the corresponding database persistence code is generated at step 309, leveraging the Universal Database Sub-Module/API of the underlying Pervasive Computing Platform.

The Universal UI Database consists of:

1) An Interface, (UniversalDBAction) which represents the type of actions that can be done on a database:
   a) UniversalDBAction addUpdate(String dbQuery);—adds an update query
   b) UniversalDBAction addUpdate(String dbQuery, Object[ ] replacementParms);—adds an update query with replacement parameters
   c) UniversalDBAction addQuery(String dbQuery, Object type);—adds a query with an object that will contain the result set for each row
   d) UniversalDBAction addQuery(String dbQuery, Object type, Object[ ] replacementParms);—adds a query with query parameters and with an object that will contain the result set for each row,
   e) UniversalDBAction addQuery(String dbQuery, Object[ ] replacementParms);
   f) UniversalDBAction addQuery(String dbQuery);—adds a Query
   g) int sqlSize( )—gets the size of the current set of SQL statements
   h) UniversalDBAction clear( )—clears the current set of SQL statements
   i) List execute(IJDBCProperties info);—executes the current set of SQL statements There is Database Factory, which loads an instance of the appropriate class that implements the above interfaces; based on the platform the application is running on and configuration settings describing the desired database type. The implementation class is exposed as a remotely accessible object via the first interface described above. The object is bound to the Universal White Pages, with a well-known name. From that point on the local application simply communicates with the Universal Database interface described above. Remote nodes can communicate with the remotely accessible interface, by discovering it via the Universal White Pages, based on its well-known name.

For those classes marked as agents, the corresponding agent code is generated at step 310, leveraging the Universal Agent Sub-Module/API of the underlying Pervasive Computing Platform.

The Universal Agent Interface may include:

1) An Agent Interface, which represents the type of actions that can be done on a Software Agent:
   a. void addBehaviour(Behavior b)—adds a new behavior to the agent.
   b. void afterMove( )—Actions to perform after moving.
   c. void beforeMove( )—placeholder shall be overridden by user defined agents to execute some actions before the original agent instance on the source container is stopped (e.g. releasing local resources such as a GUI).
   d. Message blockReceive( )—receives an ACL message from the agent message queue.
   e. Message blockReceive(long millis)—Receives an ACL message from the agent message queue, waiting at most a specified amount of time.
   f. void activate( )—Make a state transition from suspended to active or waiting (whichever state the agent was in when doSuspend( ) was called) within Agent Platform Life Cycle.
   g. void clone(Location destination, String newName)—Make this agent be cloned on another location.
   h. void delete( )—Make a state transition from active, suspended or waiting to deleted state within Agent Platform Life Cycle, thereby destroying the agent.
   i. void move(Location destination)—Make this agent move to a remote location.
   j. void suspend( )—Make a state transition from active or waiting to suspended within Agent Platform Life Cycle; the original agent state is saved and will be restored by a doActivate( ) call.
   k. void wait( )—Make a state transition from active to waiting within Agent Platform Life Cycle.
   l. void wait(long millis)—Make a state transition from active to waiting within Agent Platform Life Cycle.
   m. void wake( )—Make a state transition from waiting to active within Agent Platform Life Cycle.
   n. State getAgentState( )
   o. ID getID( )—queries the private Agent ID.
   p. ID getAMS( )—Get the Agent ID for the platform AMS.
   q. Object[ ] getArguments( )—Get the array of arguments passed to this agent.
   r. Object getController( )—Return a controller for the container this agent lives in.
   s. ID getDefaultDF( )—Get the Agent ID for the platform default DF.
   t. String getHap( )—queries the Home Agent Platform.
   u. String getName( )—queries the agent complete name (GUID).
   v. Location here( )—retrieves the location this agent is currently at.
   w. boolean isRestarting( )—returns true when this agent is restarting after a crash.
   x. void postMessage(Message msg)—Put a received message into the agents queue.
   y. void putBack(Message msg)—Puts a received ACL message back into the queue.
   z. Message receive( )—Receives an ACL message from the agent message queue.
   aa. void removeBehavior(Behavior b)—removes a given behavior from the agent.
   bb. void send(Message msg)—Send an ACL message to another agent.
   cc. void setQueueSize(int newSize)—Set message queue size.
   dd. void setup( )—empty placeholder for application specific startup code.
   ee. void takeDown( )—empty placeholder for application specific cleanup code.

There is an Agent Factory, which loads an instance of the appropriate class that implements the above interface; based on the platform the application is running on, as well as configuration information describing any particularly desired agent platform. The implementation class is exposed as a remotely accessible object via the first interface described above. The object is bound to the Universal White Pages, with a well-known name. From that point on the local application communicates with the Universal Agent interface described above.

For those classes marked as location-aware, the corresponding location awareness code is generated at step 311, leveraging the Universal Location & PIM Sub-Module/API of the underlying Pervasive Computing Platform.

For those classes methods associated with rule sets, the corresponding logic to interface with the rule engine is generated at step 312, leveraging the Universal Rules Sub-Module/API of the underlying Pervasive Computing Platform.

At step 313, the Classes and Interfaces are aggregated based on the packages they were associated with in duration definition of the Object Model for the application, i.e. as described in the Application Object Model tables 48 described above.

Finally, at step 314 generated source code for the node type may be stored in Class/Interface Tables 78 in the database 15. The Class/Interface Tables may define:
Class Method Source;
Application Instance UI WebView Page Source;
Application Instance UI WebView JavaScript Function;
Application Instance UI WebView Source Callback.

The system 10 may include an Application Node Type Distribution File Generation Module 19. This module generates the corresponding application distribution file (Midlet JAD, Windows Mobile CAB, Android APK, Apple APP, Blackberry COD, etc) based on device type, platform type and selected language. Classes and Interfaces are put into libraries based on the Components they were associated with during definition of the object model for the application. The module 19 associates specific node instances to deploy files and stores Application Node Type Distribution File in Deployment Tables including:
Node Application Component;
Node Application Deployment File.

Examples tables are provided in the sample database schema discussed below.

Figure 14:
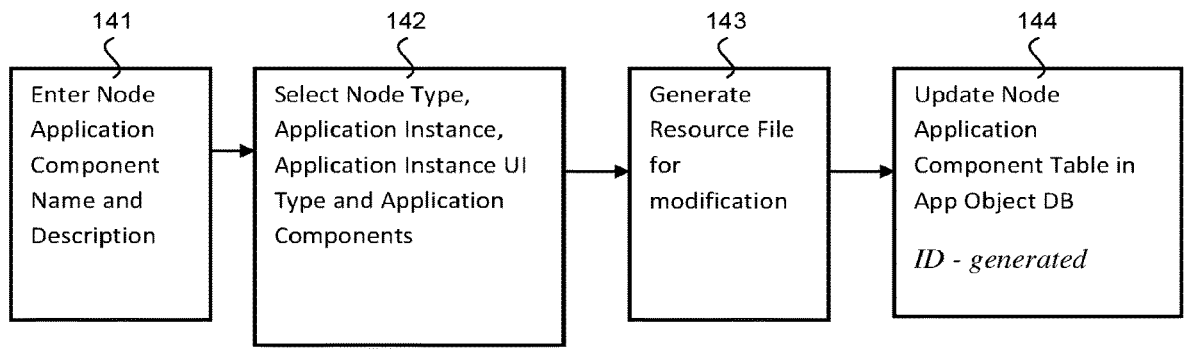
FIG. 14 shows a process for generating an node application component.
Figure 15:
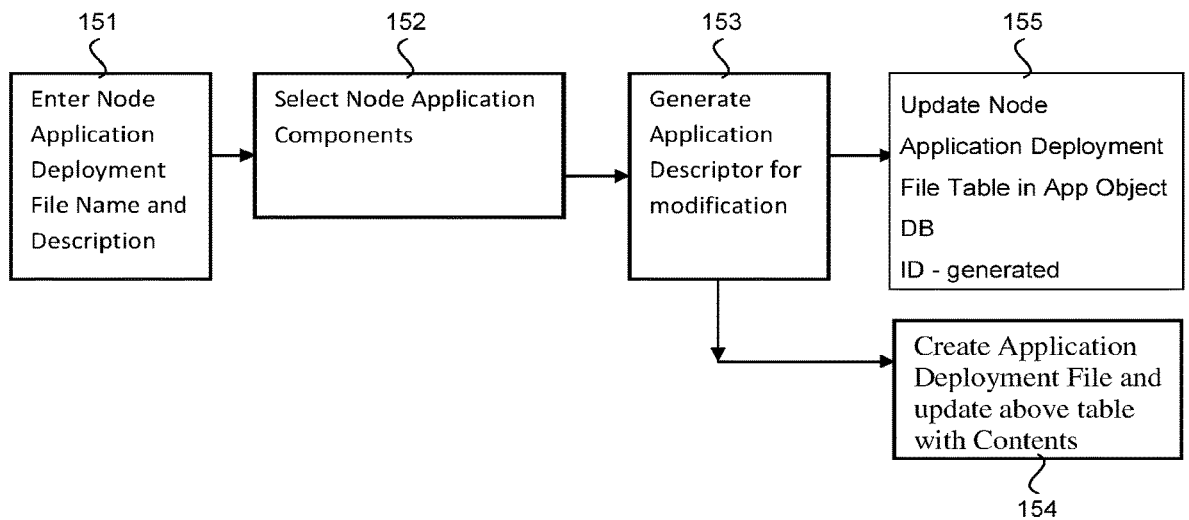
FIG. 15 shows a process for generating a node application deployment file.

A process for generating the node application component is depicted in FIG. 14. At step 141, the developer enters the node application component name and description. The developer then selects node type, application instance, application instance UI type and application components for an application component (step 142). At step 143, the generation module 19 generates the resource file for modification. The application component table is then updated with the resource file data (step 144). A process for generating the node application deployment file is depicted in FIG. 15. At step 151, the developer enters the node application deployment file name and description and selects the node application components (step 152). At step 153 the generation module 19 generates the application descriptor for modification and then creates the application deployment file (step 154). The node application deployment file table is then updated (step 155).

The Application Node Type Distribution File Generation Module 19 may also be responsible for generating the data and files required to deploy Application Deployment File to Specific Devices. The data required may be provided in tables including:

Node Instance;
Node Instance Application Deployment File.

Figure 16:
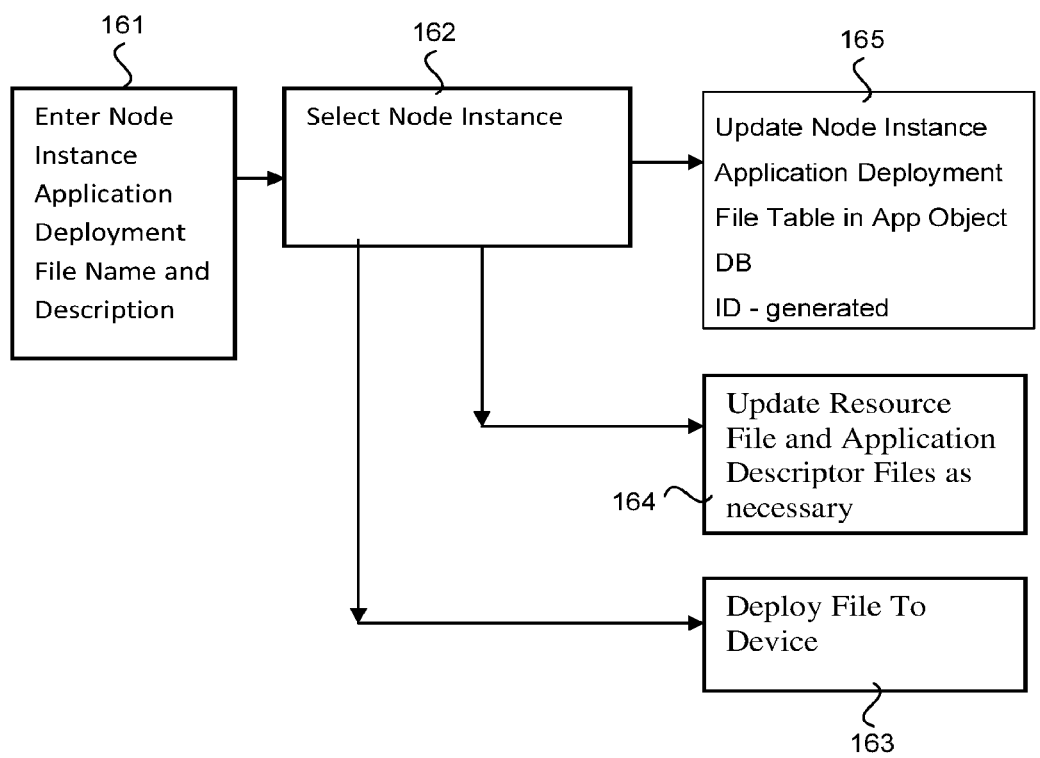
FIG. 16 shows a process for deploying the files to the devices.

A process for deploying the files to the devices is depicted in FIG. 16. At step 161, the developer enters the node instance application deployment file name and description and selects a node instance (step 162). The deployment file for the selected node instance is then deployed to the relevant device (step 163). In addition, the resource file and application description files are updated as necessary (step 164) and the node instance application deployment file table is updated (step 165).

As described above, the data, meta-data and application code may be stored as one or more tables in one or more databases, such as the database 15. An example database design may be as follows:

1) Language Type (Java, .NET Languages, Unmanaged C++, Javascript, PHP . . . )
   Id
   Name
   Description
   Scripting Language
2) Virtual Machine Language Type (JME, JSE, Dalvik, .NET, CF, Silverlight . . . )
   Id
   Name
   Description
   Language Type ID
3) OS Type (Linux/Unix, WinMobile/CE/XP, Blackberry, Mac, Symbian, TinyOS)
   Id
   Name
   Description
   Preferred Language ID
   Alternate Language ID
4) Platform Type (JSE, .NET/CF, Android, Limo, Symbian, Meego, iPhone . . . )
   Id
   Name
   Description
   OS Type ID
   Virtual Machine Language Type ID
5) Network Type (Wire/WiFi, GSM/CDMA, WiMax/LTE, Bluetooth, Zigbee, NFC)
   Id
   Name
   Description
   Supports IP V4
   Supports IP V6
6) Database Type (Relational, Object, Object-relational, XML)
   Id
   Name
   Description
7) Database Type Instance (Sqlite, DB2, DB2e, Oracle, Oracle Light, DB40)
   Id
   Name
   Description
   Database Type ID
8) Rules Engine Type (RETE, other)
   Id
   Name
   Description
   Language Type ID
9) Rules Engine Type Instance (Drools, JRules, Jess, Advisor, Oracle BRules . . . )
   Id
   Name
   Description
   Database Type ID
10) Node Type (phone, netbook, laptop, eBook, setTop, camera, router, sensor . . . )
    Id
    Name
    Description
    Platform Type
    Database Instance ID
    Screen Size (can be NA—i.e. faceless)
11) Node Type Network (node can support many network types)
    Id
    Node Type ID
    Supported Network Type ID
12) Protocol Type (SOAP, HTTP, XML-RPC, HOP, RMI/IIOP, OBEX, REST . . . )
    Id
    Name
    Description
    IP based
13) Protocol Network Type
    Id
    Name
    Description
    IP based
    Protocol ID
    Network Type ID
14) Message Type (JMS, MSMQ, RPC, Socket, DDS etc.)
    Id
    Name
    Description
    IP based
    Protocol Network Type ID
15) Serialization Type (Binary, XML, JSON, Character etc.)
    Id
    Name
    Description
16) Message Serialization Type
    Id
    Name
    Description
    Message Type ID
    Serialization Type ID
17) Application
    Id
    Name
    Description
18) Application UI Type (NA, SWT/eSWT, .NET, Java/ActionScript, PHP . . . )

Id
Name
Description
19) Application Instance UI Type (NA, SWT/eSWT, .NET, Java/ActionScript . . . )
Id
Name
Description
Application ID
Application UI Type ID
Application Manager Class ID
20) Application Component
Id
Name
Description
Application ID
21) Application Component Package
Id
Name
Description
Application ID
Component ID
22) Class
Id
Name
Description
Persistence Ind
Location Aware Ind
Data Transfer Class Ind
Mobile Ind
Agent Ind
Application ID
Component ID
Package ID
Parent Class ID
23) Interface
Id
Name
Description
Remotely Accessible Ind
Application ID
Component ID
Package ID
24) Class Attribute
Id
Name
Description
Type
Scope (private, public, protected etc)
Static-Instance
Final
25) Rule Set
Id
Name
Description
Rule Engine Type Instance ID
26) Rule
Id
Name
Description
Pseudo-code
27) Rule Property
Id
Name
Description
Value
28) Rule for Rule Set
Id
Name
Description
Rule Set ID
29) Class Method
Id
Name
Description
Return Type
Class ID
Rule Set ID
Pseudo-code
30) Interface Method
Id
Name
Description
Return Type
Interface ID
31) Method Argument
Id
Name
Description
Type
InOut/Out/In indicator
Method ID
Final
32) Exception
Id
Name
Description
Type
38) Method Exception
Id
Method ID
Exception ID
34) Class Source
Id
Name
Description
Class ID
Language Type ID
Source Code
35) Interface Source
Id
Name
Description
Interface ID
Language Type ID
Source Code
36) Class Method Source
Id
Name
Description
Class Method ID
Language Type ID
Source Code
37) Node Type Application
Id
Node Type ID
Application ID
38) Peer-2-Peer Link
Id
Name
  Description
  Node Type 1 ID
  Node Type 2 ID 39) Peer-2-Peer Link Dist Protocol
Id
Name
Description
Peer-2-Peer Link ID
Message Serialization Type ID
40) Peer Group
Id
Name
Description
41) Peer Group Node Type
Id
Name
Description
Peer Group ID
Node Type ID
Hosts Community Ind
42) Peer-2-Group Protocol (groups can communicate using many Protocols)
Id
Name
Description
Group ID
Message Serialization Type ID
43) Application Instance UI Data Representation Class
Id
Name
Description
Application Instance UI Type ID
Class ID
Create Ind
Read Ind
Update Ind
Delete Ind
Browse Ind
44) Application Instance UI WebView Page Source
Id
Name
Description
Application Instance UI Type ID
Application Instance UI WebView Class ID
JavaScript Html Source
45) Application Instance UI WebView JavaScript Function
Id
Name
Description
Application Instance UI WebView ID
JavaScript Function Name
JavaScript Source
46) Application Instance UI WebView Source Callback
Id
Name
Description
Application Instance UI Web View Source ID
"Javascript-to-native Callback" Class ID
Application Instance UI WebView JavaScript Function ID
47) Node Application Component
Id
Name
Description
Node Type ID
Application Instance ID
Application Instance UI Type ID
Application Component Package ID
Resource File Template 48) Node Application Deployment File
Id
Name
Description
Node Application Component
Application Descriptor Template
49) Node Instance
Id
Name
Description
Node Type ID
49) Node Instance Application Deployment File
Id
Name
Description
Node Application Deployment File ID
Node Instance ID
Application Deployment File Contents
Recourse File Contents
Application Descriptor Contents Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:
1. A method, comprising:
capturing a meta-data definition of an application by an application object model definition module, wherein the meta-data definition describes the application for at least a plurality of node types;
responsive to capturing the meta-data definition of the application, generating, from the meta-data definition of the application, code for the application per node type for the plurality of node types in a code generator module; and
generating packaging necessary to deploy the application to the plurality of node types;
wherein capturing the meta-data definition of the application comprises capturing a definition of peer-to-peer messaging between the plurality of node types, and wherein generating the code for the application per node type for the plurality of node types comprises generating the code for the application per node type for the plurality of node types that enables the application to communicate peer-to-peer between the plu- rality of node types in accordance with the captured definition of peer-to-peer messaging between the plurality of node types.

2. The method of claim 1 wherein capturing the meta-data definition of the application comprises capturing one or more of language types, VM language types, operating system types, platform types, network types and database types.

3. The method of claim 1 wherein capturing the meta-data definition of the application comprises capturing a messaging type between a plurality of node types.

4. The method of claim 1 further comprising compiling the code for the application per node type for the plurality of node types.

5. The method of claim 1 further comprising capturing a definition of peer-to-group messaging including network type and protocol preference.

6. The method of claim 1 wherein capturing the meta-data definition of the application comprises describing an Application Object Model and describing the Application Object Model through an Object Model Repository.

7. The method of claim 1 wherein capturing the meta-data definition of the application comprises capturing an object model of the application and capturing meta-data for the object model of the application.

8. The method of claim 1 wherein capturing the meta-data definition of the application comprises capturing whether the application is persistable.

9. The method of claim 1 wherein capturing the meta-data definition of the application comprises capturing whether the application is location-aware.

10. The method of claim 1 wherein capturing the meta-data definition of the application comprises capturing whether the application is mobile.

11. A system comprising at least one processor and an operatively associated memory, wherein the at least one processor executes a plurality of modules comprising:
an application object model definition module that captures a meta-data definition of an application, wherein the meta-data definition describes the application for at least a plurality of node types;
a code generator module that, responsive to the capture of the meta-data definition of the application, generates application code for the object model of the application defined through the application object model definition module and generates a package necessary to deploy the application to the plurality of node types; and
an application node connectivity module that allows the user device to define the plurality of node types to participate in the application, wherein the code generator module generates the application code for the object model of the application for each of the plurality of node types;
wherein the application node connectivity module allows the user device to define peer-to-peer messaging between the plurality of node types, and wherein the code generator module generates the application code that enables the application to communicate peer-to-peer between the plurality of node types in accordance with the defined peer-to-peer messaging between the plurality of node types.

12. The system of claim 11 wherein the application node connectivity module allows the user device to define peer-to-peer messaging between the plurality of node types including network type and protocol preference.

13. The system of claim 11 wherein the code generator module generates the application code that enables the application to communicate peer-to-peer between the plurality of node types in accordance with the defined peer-to-peer messaging between the plurality of node types including network type and protocol preference.

14. The system of claim 11 further comprising one or more class libraries or executable libraries per node type, wherein the code generator module generates the application code for a node type with reference to the respective one or more class libraries or executable libraries.

15. The system of claim 11 wherein the application object model definition module captures the meta-data definition of the application comprising one or more of language types, VM language types, operating system types, platform types, network types and database types.

16. The system of claim 15 wherein the meta-data definition comprises at least one indicator that indicates whether the application is persistable.

17. The system of claim 15 wherein the meta-data definition comprises at least one indicator that indicates whether the application is location-aware.

18. The system of claim 15 wherein the meta-data definition comprises at least one indicator that indicates whether the application is mobile.

19. A non-transitory computer-readable medium storing computer-executable instructions for execution by at least one processor, that, when executed by the at least one processor, cause the at least one processor to:
provide an interface by an application object model definition module that allows a user device to enter a meta-data definition of an application, wherein the meta-data definition describes the application for at least a plurality of node types, and wherein the meta-data definition comprises a definition of peer-to-peer messaging between the plurality of node types;
responsive to the user entering the meta-data definition of the application, generate, from the meta-data definition of the application, application code for the application per node type for the plurality of node types in accordance with the definition of peer-to-peer messaging between the plurality of node types; and
generate packaging necessary to deploy the application to the plurality of node types;
wherein generating the application code for the application per node type for the plurality of node types comprises generating the application code for the application per node type for the plurality of node types that enables the application to communicate peer-to-peer between the plurality of node types in accordance with the definition of peer-to-peer messaging between the plurality of node types.

20. The non-transitory computer-readable medium of claim 19 wherein the at least one processor is caused to compile the application code for the application per node type for the plurality of node types.

* * * * *